(12) United States Patent
Consonni et al.

(10) Patent No.: US 8,503,075 B2
(45) Date of Patent: Aug. 6, 2013

(54) HIGH-EFFICIENCY DEVICE FOR FOCUSING LIGHT TO SUBWAVELENGTH DIMENSIONS

(75) Inventors: Marianne Consonni, Lyons (FR); Jérôme Hazart, Eybens (FR); Gilles Lerondel, Saint Julien les Villas (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 93 days.

(21) Appl. No.: 12/993,608

(22) PCT Filed: May 19, 2009

(86) PCT No.: PCT/EP2009/056083
§ 371 (c)(1),
(2), (4) Date: Nov. 19, 2010

(87) PCT Pub. No.: WO2009/141353
PCT Pub. Date: Nov. 26, 2009

(65) Prior Publication Data
US 2011/0063717 A1      Mar. 17, 2011

(30) Foreign Application Priority Data

May 20, 2008    (FR) ...................... 08 02732

(51) Int. Cl.
*G02B 5/00*   (2006.01)
*G02B 3/02*   (2006.01)
(52) U.S. Cl.
CPC ............... *G02B 5/008* (2013.01); *Y10S 359/90* (2013.01)
USPC ............................ 359/360; 359/722; 359/900

(58) Field of Classification Search
CPC ....................................................... G02B 5/008
USPC .......... 359/298, 722, 738, 359–360; 250/353
See application file for complete search history.

(56) References Cited

U.S. PATENT DOCUMENTS

| 6,834,027 B1 | 12/2004 | Sakaguchi et al. |
| 6,982,844 B2 | 1/2006 | Rettner et al. |
| 7,085,220 B2 | 8/2006 | Fujikata et al. |

(Continued)

FOREIGN PATENT DOCUMENTS

| JP | 2006259064 A | 9/2006 |
| WO | 2006067734 A1 | 6/2006 |

OTHER PUBLICATIONS

Boreman, Glenn D. et al. "Broadband Electrical Permittivity of Gold for Plasmonics and Nano-Optics Applications." OSA/CLEO 2011 (2010): pp. 1-2. Print.*

(Continued)

*Primary Examiner* — Zachary Wilkes
(74) *Attorney, Agent, or Firm* — Baker & Hostetler, LLP (57) ABSTRACT

The general field of the invention is that of devices for focusing light to subwavelength dimensions including at least one focusing structure having a metal film provided with a first aperture that penetrates the film, the aperture having dimensions an order of magnitude smaller than the working wavelength of the focusing device. In the devices according to the invention, the focusing structure has at least one optical cavity placed around the aperture so that, when the structure is illuminated with a radiant flux at the working wavelength of the device, a large part of this flux is concentrated on the aperture by said cavity. Several embodiments are described using various cavities that may comprise plasmon reflectors.

17 Claims, 7 Drawing Sheets

U.S. PATENT DOCUMENTS

| | | | |
|---|---|---|---|
| 7,106,935 | B2 | 9/2006 | Challener |
| 7,149,395 | B1 | 12/2006 | Chen et al. |
| 7,154,820 | B2 | 12/2006 | Nakada et al. |
| 7,772,555 | B2 * | 8/2010 | Hollingsworth .............. 359/298 |
| 2005/0053974 | A1 * | 3/2005 | Lakowicz et al. ................. 435/6 |
| 2006/0274611 | A1 | 12/2006 | Challener |
| 2007/0048628 | A1 | 3/2007 | Mackey |

OTHER PUBLICATIONS

"Physical Constants of Organic Compounds," in CRC Handbook of Chemistry and Physics, 92nd Edition (Internet Version 2012), W. M. Haynes, ed., CRC Press/Taylor and Francis, Boca Raton, FL.*

Flammer, et al., "Interference and Resonance Cavity Effects Explain Enhanced Transmission Through Subwavelength Apertures in Thin Metal Films," Optics Express, Optics Soc. of Amer., vol. 15, No. 13, pp. 7984-7993 (Jun. 25, 2007).

Robert, et al., "Le nouveau petit Robert," Dictionnaires Le Robert, article "TROU" XP002539605, p. 2322 (1993).

Lezec, et. al. "Beaming Light from a Subwavelength Aperture," Science 297, 820-822 (Aug. 2, 2002).

Martin-Moreno, et al., "Theory of Highly Directional Emission from a Single Subwavelength Aperture Surrounded by Surface Corrugations," Phys. Rev. Lett. 90, 167401-1-167401-4 (Apr. 25, 2003).

Degiron, et al., "Analysis of the transmission process through single apertures surrounded by periodic corrugations," Opt. Expr. 12, 3694-3700 (Aug. 9, 2004).

Caglayan, et al. "Beaming of electromagnetic waves emitted through a subwavelength annular aperture," J. Opt. Soc. Am. B, 23, 419-422 (Sep. 1, 2005).

Janssen, et al., "Giant Optical Transmission of a Subwavelength Slit Optimized Using the magnetic Field Phase," Phys. Rev. Lett., 99, 043902-1-043902-4 (Jul. 27, 2007).

Maier, et al,. "Terahertz Surface Plasmon-Polariton Propagation and Focusing on Periodically Corrugated Metal Wires," Phys. Rev. Lett. 97, 176805-1-176805-4 (Oct. 27, 2006).

Ropers, et al., "Grating-Coupling of Surface Plasmons onto Metallic Tips: A Nanoconfined Light Source," Nano Lett., 7, 2784-2788 (2007).

J. Conway, "Efficient Optical Coupling to the Nanoscale," Thesis, UCLA, 1-150 (2006).

S. Maier, "Clear for launch," Nature Phys. 3, 301-303 (2007).

Fu, et al., "Plasmonic microzone plate: Superfocusing at visible regime," Appl. Phys. Lett., 91, 061124-1-061124-3 (2007).

Fu, et al., "Near-field behavior of zone-plate-like plasmonic nanostructures," J. Opt. Soc. Am. A, 25, 238-249 (2008).

Radko, et al., "Surface plasmon polariton beam focusing with parabolic nanoparticle chains," Opt. Exp., 15, 6576-6582 (May 28, 2007).

Weeber, et al., "Near-filed characterization of Bragg mirrors engraved in surface plasmon waveguides," Phys. Rev. B, 70, 235406-1-235406-12 (2004).

Weeber, et al., "Submicrometer In-Plane Integrated Surface Plasmon Cavities," Nano Lett., 7, 5, 1352-1359 (2007).

Kurokawa, et. al, "Mwetal-insulator-metal plasmon nanocavities: Analysis of optical properties," Phys. Rev. B, 75, 035411-1-035411-13 (2007).

Flammer, et al., "Interference and resonant cavity effects explain enhanced transmission through subwavelength apertures in think metal fils," Opt. Expr. 15 7984-7993 (Jun. 25, 2007).

* cited by examiner

HIGH-EFFICIENCY DEVICE FOR FOCUSING LIGHT TO SUBWAVELENGTH DIMENSIONS

CROSS-REFERENCE TO RELATED APPLICATIONS

This application is a National Stage of International patent application PCT/EP2009/056083, filed on May 19, 2009, which claims priority to foreign French patent application No. FR 08 02732, filed on May 20, 2008, the disclosures of which are incorporated by reference in their entirety.

FIELD OF THE INVENTION

Background of the Invention

The field of the invention is the field of optical focusing devices for focusing light to subwavelength dimensions. The expression "subwavelength optical focusing device" is understood to mean a device that, when illuminated, allows the creation of secondary sources having dimensions considerably smaller than the wavelength. These types of secondary sources have a great many applications, including applications in the fields of nanolithography and optical data storage as well as applications in biology, microscopy, etc.

It is known that, in classical optics, one of the constraints limiting the size of a light source is due to the diffraction of light, the minimum source dimension being of the order of magnitude of the wavelength. Various techniques allow this limit to be overcome and make it possible to produce devices for focusing light which, when they generate sources having dimensions of about a few nanometers or a few tens of nanometers, are conventionally called nanosources.

One of the main techniques used consists in illuminating a hole that is smaller than the wavelength, said hole being pierced in a metal film. Thus, a light spot is obtained as output from the hole, the spot having a subwavelength spot size. By this means alone it is difficult to obtain a high intensity and a good directivity. Thus, various techniques have been proposed that improve these parameters.

Figure 1:
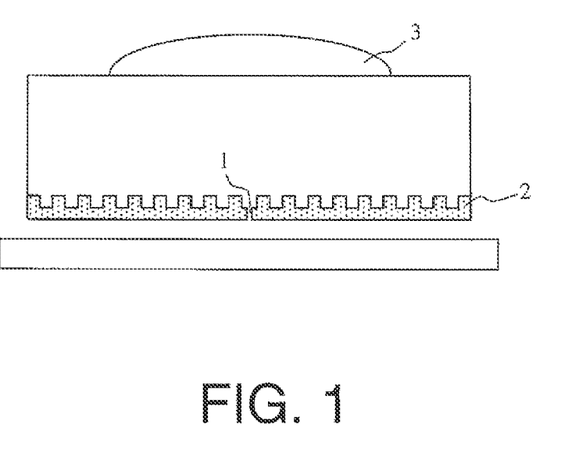
FIGS. 1 and 2 show a first embodiment of an optical focusing device according to the prior art.
Figure 2:
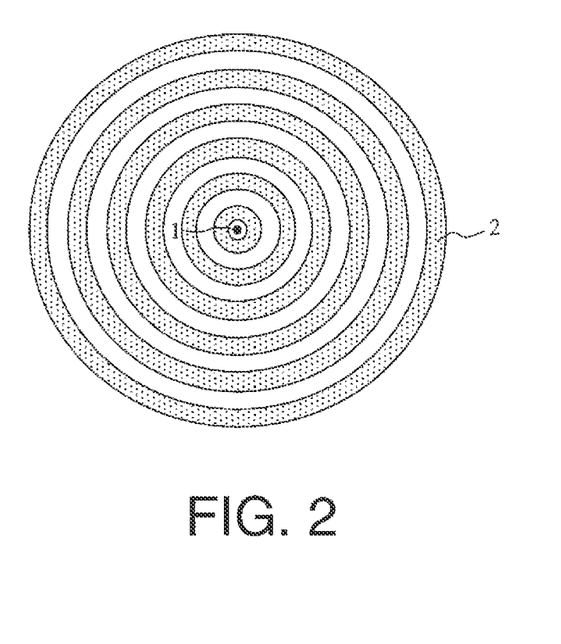

The first of these techniques is called surface-plasmon enhanced transmission. Plasmons are particular solutions of Maxwell's equations at the interface between certain media, notably metals. The optical focusing devices according to this technique comprise, as shown in FIGS. 1 and 2, concentric metal arrays 2 centered on the focusing hole 1. A macroscopic lens 3 may be added to the device. FIG. 1 is a schematic cross section of the device and FIG. 2 is a top view of the metal array 2 of the same device. When this device is illuminated, surface plasmons are generated. The propagation and then the coupling of these plasmons with the modes of the hole then causes the total flux introduced into the subwavelength aperture to be increased and improves the energy efficiency of the device. The efficiency is the ratio of the radiant power transmitted through the subwavelength aperture to the total radiant power with which the device is illuminated. Examples of this type of device are found in the patents or patent applications: U.S. Pat. No. 6,834,027, U.S. Pat. No. 6,982,844, U.S. Pat. No. 7,085,220, U.S. Pat. No. 7,149,395, U.S. Pat. No. 7,154,820, WO 2006/067734 and US 2007/0048628 and the following publications: Science 297, 820 (2002), Phys. Rev. Lett. 90, 167401 (2003), Opt. Expr. 12, 3694 (2004), J. Opt. Soc. Am. B, 23, 419 (2006), Opt. Expr. 15, 7984 (2007) and Phys. Rev. Lett. 99, 043902 (2007). This technique allows the radiant flux transmitted through the aperture to be significantly improved. However, this device still has a mediocre efficiency. With this type of device an efficiency of greater than 10% is considered to be good and an efficiency of greater than 20% is considered to be very good. In addition, the smallest spot size obtained remains about a few hundred nanometers, which may prove to be unsatisfactory for certain applications.

Figure 3:
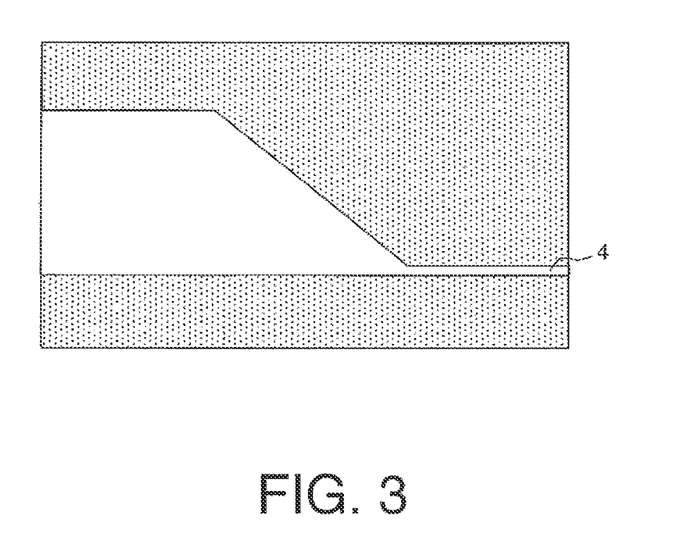
FIGS. 3 and 4 show two variants of a second embodiment of an optical focusing device according to the prior art.
Figure 4:
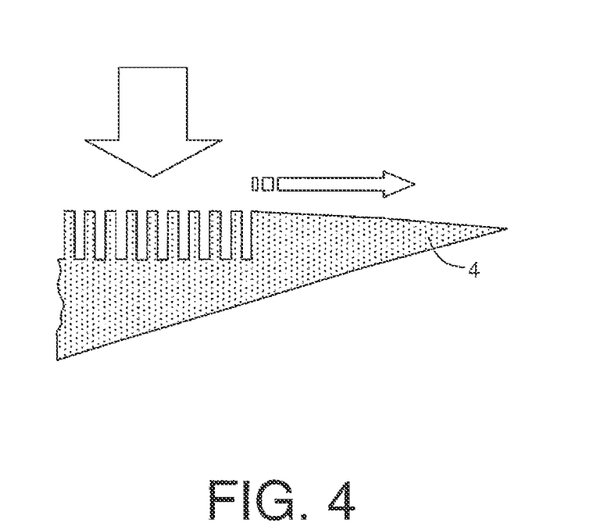

The second of these techniques is called surface-plasmon enhanced confinement. The objective of this technique is to allow a highly localized region to be intensely heated. The principle consists in propagating plasmons along a waveguide or a metal taper 4, the cross section of which progressively decreases. The field of the plasmons is thus progressively confined to a very small cross section, which consequently leads to the field strength increasing. FIGS. 3 and 4 illustrate two possible embodiments of this technique. In FIG. 3, the taper is formed from a metal-dielectric-metal waveguide. The dielectric part is triangular ensuring the confinement. In this example, the width of the cross section of the taper varies from 50 nanometers at its widest to only 1 nanometer at its thinnest (on the right of FIG. 3). The metal may be silver and the dielectric may be silica. In FIG. 4, the taper 4 is formed from a nanostructured metal tip. In this figure, the vertical arrow shows the excitation wave and the horizontal arrow shows the plasmon wave generated. Examples of this type of device are found in the U.S. Pat. No. 7,106,935, US 2006/0274611 and in the publications Phys. Rev. Lett. 97, 176805 (2006) and Nano Lett. 7, 2784 (2007) as well as in the thesis of J. Conway (UCLA, 2006). In this case, the field confinement results are very conclusive. Thus, it is possible to obtain spot sizes of less than 10 nanometers. However, this type of device remains difficult to produce experimentally and has a poor efficiency.

Figure 5:
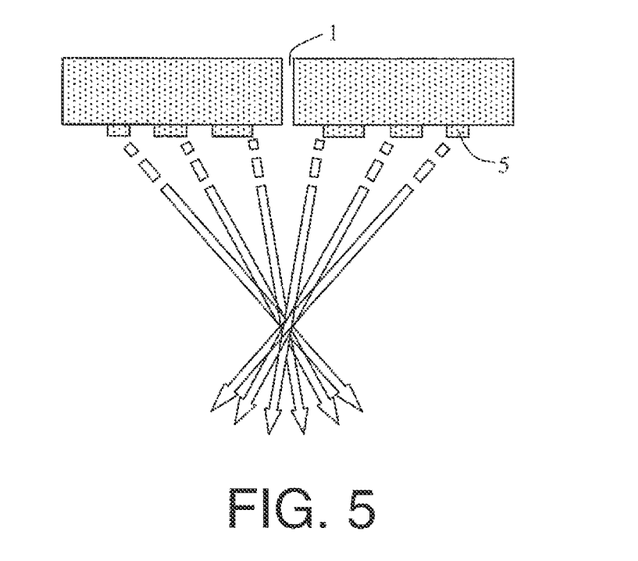
FIGS. 5 and 6 show two variants of a third embodiment of an optical focusing device according to the prior art.
Figure 6:
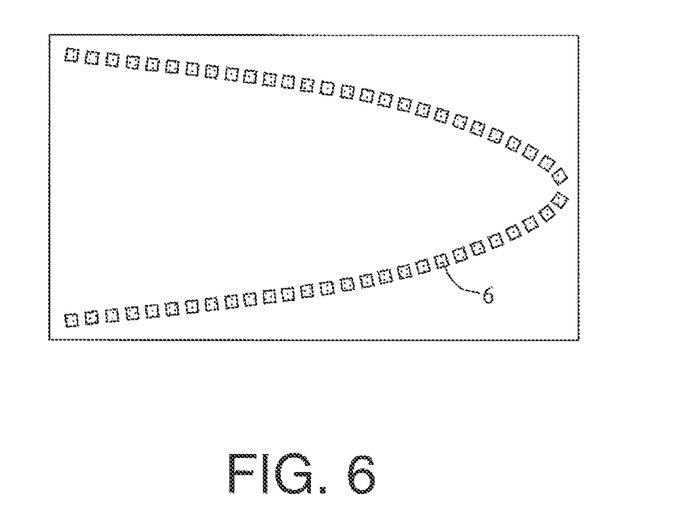

The last technique for obtaining a subwavelength optical focusing device is based on the focusing of surface plasmons. The principle consists in exciting plasmons in various directions so that their propagation in each of these directions makes them converge on a single point and thus generates an intense spot of small dimensions. By way of examples, FIGS. 5 and 6 illustrate two possible embodiments of this technique. In FIG. 5, the plasmons are focused using variable-pitch arrays 5 positioned at the outlet of a subwavelength hole 1. In FIG. 6, the focus is obtained by exciting plasmons along a parabolic chain of nanoparticles 6. Examples of these types of devices are found in the following publications: Nature Phys. 3, 301 (2007), Appl. Phys. Lett. 91, 061124 (2007), J. Opt. Soc. Am. A, 25, 238 (2008) and Opt. Expr. 15, 6576 (2007). This technique has the advantage of allowing the distance between the structure and the position of the light spot generated to be directly controlled. The dimensions of the latter remain however relatively large, which may be a problem for certain applications.

These techniques have a number of drawbacks. In the case of surface-plasmon enhanced transmission or surface-plasmon focusing, the light spot size obtained remains fairly large, about a few hundred nanometers wide if wavelengths in the visible range are considered. This is still unsatisfactory for a good number of applications that manipulate the field on the nanoscale—like lithography or high-density optical data storage applications. Surface-plasmon enhanced confinement enables a significant confinement of the field. However, it is more difficult to implement and the efficiency of these structures remains quite low, about a few percent. In the case of surface-plasmon enhanced transmission, the efficiency is also unsatisfactory.

SUMMARY OF THE INVENTION

The secondary point source produced by the focusing device according to the invention does not have these drawbacks. The principle employed consists in enhancing the transmission of a focusing device comprising at least one subwavelength aperture that may, for example, be a slit pierced in a metal film, said aperture being surmounted by an optical cavity that increases the efficiency of the device.

More precisely, the subject of the invention is an optical focusing device comprising at least one focusing structure consisting of a metal film provided with at least one aperture that penetrates the film, said aperture having dimensions an order of magnitude smaller than the working wavelength of the focusing device, characterized in that the focusing structure comprises at least one optical cavity that opens into the aperture so that, when the structure is illuminated with a radiant flux at the working wavelength of the focusing device, a significant part of this flux is concentrated on the aperture or apertures by said cavity.

Preferably, the metal film is provided with a single aperture that penetrates the film.

Advantageously, the optical cavity is centered on the aperture.

In a first embodiment, the optical cavity may comprise at least one mirror, the mirror being made of alternating layers deposited onto the film to form plasmon-reflecting patterns; the layers are made of metal and dielectric alternately and have the function of reflecting plasmons, said plasmons being generated when the focusing structure is illuminated by a radiant flux at the working wavelength of the optical focusing device.

Advantageously, in this case, the pitch of the plasmon-reflecting patterns is substantially equal to a half plasmon-wavelength.

Advantageously, the layers are concentric, centered on the aperture and placed on the film.

In a second embodiment, the cavity is a hole produced in the metal film so as to open into at least one aperture, the diameter of the cavity being at least one or two orders of magnitude greater than the dimensions of said aperture and the depth of the cavity being less than the thickness of the metal film.

In a third embodiment, the cavity is a hole produced in the metal film so as to open into at least one aperture and the structure consists of alternating layers that form patterns and are placed on the film, the layers being made of metal and dielectric alternately, the function of the layers being to enhance plasmon generation.

Preferably, the pitch of the patterns enhancing plasmon generation is substantially equal to an integral number of plasmon wavelengths. The film may comprise a single aperture and the cavity may be centered on the aperture. The cross section of the patterns may be either substantially rectangular or substantially trapezoidal.

Advantageously, the film is made of a metal able to support plasmons at the wavelength in question Preferably, the film is made of silver or of gold for applications in the visible and in the infrared and the film is made of aluminum for applications in the ultraviolet.

Advantageously, the dielectric is transparent at the illumination wavelength.

According to one feature, the dielectric used for applications in the visible is silica or a resin or even polymethyl methacrylate (PMMA).

Advantageously, the optical focusing device comprises a substrate on which the focusing structure is placed, the substrate comprising a layer made of a luminescent material.

This feature has the advantage of using the luminescent material directly as a light source for operating the focusing device.

The invention also relates to a process for producing an optical focusing device having the features defined above, such that:

in a first step, a dielectric layer is deposited onto a substrate;
in a second step, the cavity and/or pattern layers are etched into the dielectric layer using lithography;
in a third step, a metal film is deposited, for example evaporated, sputtered or spin-coated (spin-coating at high-speeds allowing uniform layers to be obtained) onto the dielectric layer patterns so as to form the cavity and/or the patterns; and
in a fourth step, the metal film is pierced, in particular by means of a focused ion beam, so as to produce the first aperture.

BRIEF DESCRIPTION OF THE DRAWINGS

The invention will be better understood and other advantages will appear on reading the following description given by way of nonlimiting example and by virtue of the appended figures in which.

DETAILED DESCRIPTION

As has been stated, the crux of the device according to the invention consists in creating above at least one subwavelength aperture of the optical focusing device a cavity that in particular serves to concentrate energy. There are various ways of producing this cavity. This type of structure may be designed and optimized using the finite element method, for example using a software package like "Comsol Electromagnetics", or else using the FDTD (finite difference time domain) method or even using another suitable electromagnetic modeling software package. The modeling may be carried out in two dimensions, the simulation possibly being subsequently extended into the third dimension by applying a symmetry of revolution or else by adding structures along the third axis. The various geometrical parameters of the device may be input into the Comsol or FDTD or other electromagnetic modeling software package. The optimization method, for example written in a scripting language such as Matlab or Python—used to define the model geometry—may be a local simplex-based optimization. Primarily, the four most important dimensions of the metal geometry are optimized namely: the pitch a and the depth of the layers that form the array, when there is one; the width D of the cavity that they form; and the thickness e of the metal film.

Figure 7:
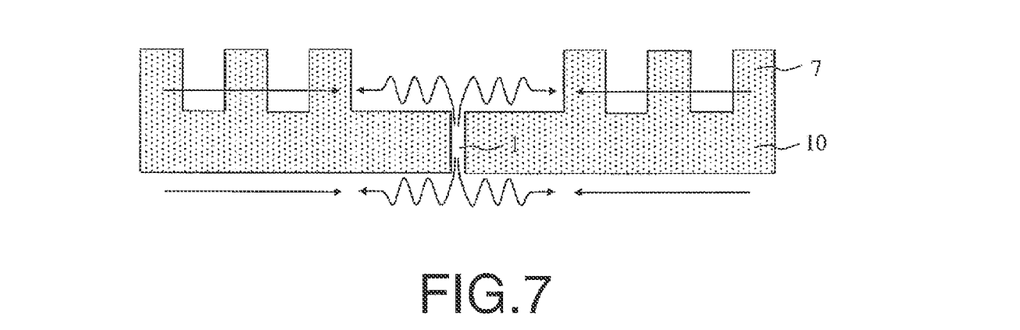
FIGS. 7 and 8 show a first embodiment of an optical focusing device according to the invention.
Figure 8:
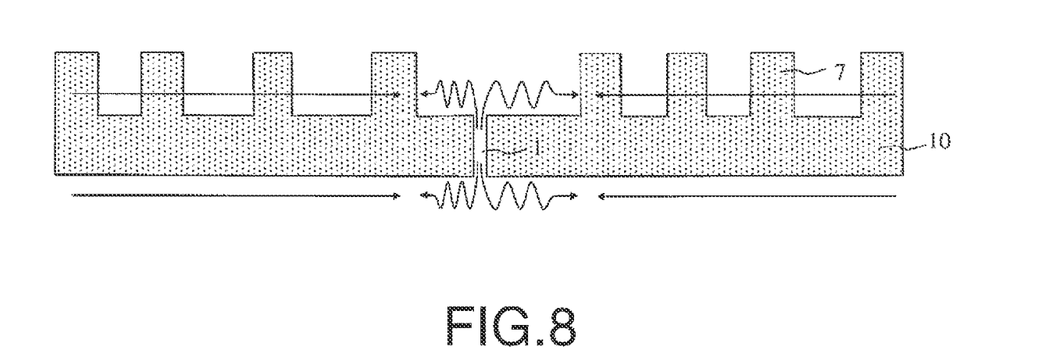

A first exemplary embodiment, illustrated in FIGS. 7 and 8, of the optical focusing device comprises plasmon-reflecting mirrors 7. The device consists of a subwavelength aperture 1 pierced in a metal film 10 near which plasmon reflectors 7 have been placed, said reflectors being formed by concentric, alternating layers that encircle the aperture and form an array. These layers are made of a metal and a dielectric alternately (for more information see: Weber et al., Phys. Rev. B 70, 235406 (2004) and Nano Lett. 7, 1352 (2007)). These mirrors create a cavity around the aperture and concentrate the radiant flux near the latter, reducing losses from the system and increasing the amount of field able to couple with the aperture. The combination of these two phenomena lead then to an increase in the output intensity of the device. The layers may be placed either symmetrically as illustrated in FIG. 7 or asymmetrically as illustrated in FIG. 8. Similarly, the layers may be either centered on the aperture as illustrated in FIG. 7 or off-centered as illustrated in FIG. 8. The device may also comprise either one aperture (as is the case in FIGS. 7 and 8) or a plurality of apertures. The plasmon wavelength is calculated from the following dispersion equation:

$$\lambda_{SP} = \lambda \cdot \sqrt{\frac{\varepsilon_d + \varepsilon_m}{\varepsilon_d \cdot \varepsilon_m}},$$

$\lambda$ being the illumination wavelength and $\varepsilon_d$ and $\varepsilon_m$ being the permittivity of the dielectric and of the metal film, respectively.

It is important that the plasmons generated by the aperture and those reflected by the array are in phase. This criterion is fulfilled when the width D of the cavity is substantially equal either to the illumination wavelength or to an integral number p of half-wavelengths $\lambda_{sp}$ of the plasmons which interfere.

By way of a nonlimiting exemplary embodiment of an optical focusing device comprising plasmon-reflecting mirrors, the illumination wavelength is 532 nanometers, the light is polarized in the TM (transverse magnetic) mode, the substrate carrying the device is made of glass having a refractive index of 1.48, the dielectric is a 150 nm thick layer of PMMA (polymethyl methacrylate) having a refractive index of 1.49 and the metal layer is deposited onto said PMMA layer. The metal film is a silver film having a complex refractive index of 0.05+3.43i at the wavelength of 532 nanometers and its thickness is approximately 50 nanometers. The dimensions of the aperture are about a few tens of nanometers. The aperture may be for example a 30 nm wide slit perforating the silver film or a circular aperture. In this configuration, and with this choice of material, the plasmon wavelength $\lambda_{sp}$ is about 320 nanometers. The reflectors may be metal layers the pitch of which is substantially equal to half the wavelength of the plasmons to be reflected i.e. around 160 nanometers. The depth of the patterns in the layers may be around 75 nanometers. In the present case, the optimal width of the cavity is substantially 305 nanometers.

Figure 9:
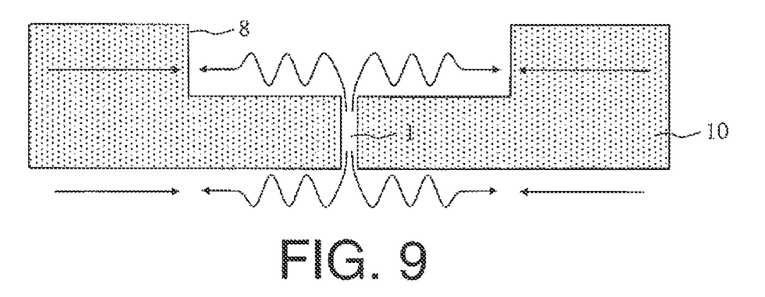
FIGS. 9 and 10 show a second embodiment of an optical focusing device according to the invention.
Figure 10:
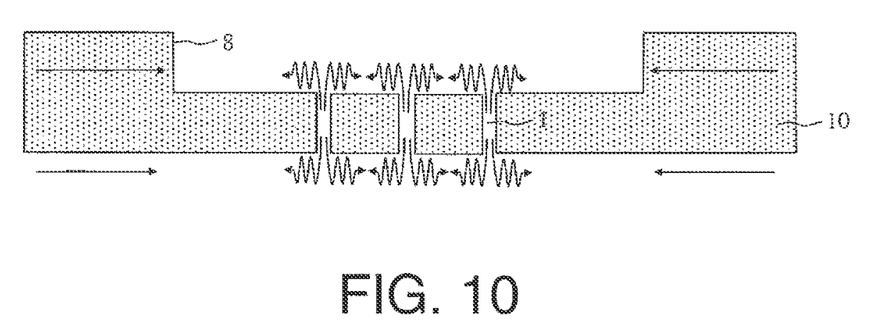

A second exemplary embodiment, illustrated in FIGS. 9 and 10, of the optical focusing device comprises a metal resonant cavity. Said device is essentially made of a subwavelength aperture 1 pierced in a metal film 10, the cavity being then a hole 8 produced in the metal film, the cavity opening into either a single aperture (the case shown in FIG. 9) or a plurality of apertures (the case shown in FIG. 10), the diameter of the cavity being one or two orders of magnitude greater than the dimensions of the apertures and its depth being less than the thickness of the metal film. The efficiency of the above system is thus improved upon by replacing the alternating metal/dielectric plasmon-reflecting mirrors with a single metal film. A better reflectivity is thus obtained, thereby reducing the absorption losses in the mirrors. This arrangement then increases the amount of field able to couple with, and be transmitted through, the aperture. This all-metal cavity in fact supports eigenmodes (for more information see the Physics Review B article Phys. Rev. B, 75, 035411 (2007)), the excitation of which leads to the field being concentrated in this cavity. The cavity acts simultaneously as a concentrator and a store of energy for transmission through the subwavelength aperture, thereby increasing the intensity of the light spot output. The width of the cavity must be at least three times greater than the dimensions of the aperture and preferably substantially equal either to the illumination wavelength or to an integral number p of half-wavelengths $\lambda_{sp}$ of the plasmons which interfere. It is preferable for p to be equal to 1, or less than or equal to 5.

As in the above example, an optical focusing device comprising a metal resonant cavity may operate at the illumination wavelength of 532 nanometers, the light being polarized in the TM (transverse magnetic) mode, the substrate carrying the device is made of glass covered by a layer of PMMA, and the metal layer being deposited onto said PMMA layer. The metal film is a silver film. In the present case, the optimal width of the cavity is substantially 300 nanometers.

Figure 11:
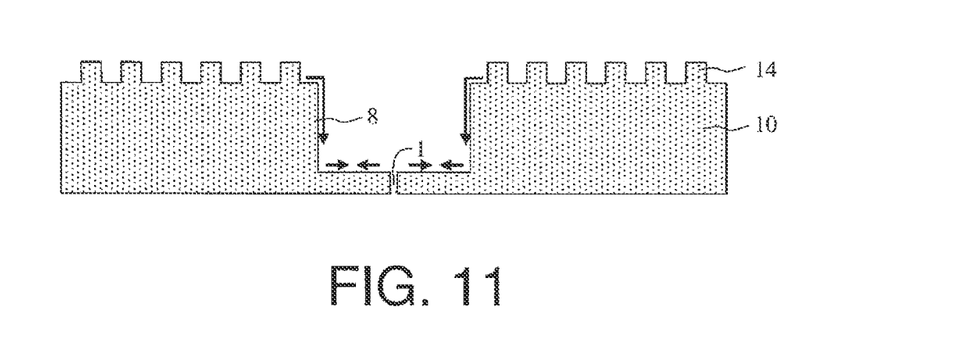
FIG. 11 shows a third embodiment of an optical focusing device according to the invention.

A third exemplary embodiment, illustrated in FIG. 11, of the optical focusing device comprises a surface-plasmon-enhanced metal resonant cavity 8. The objective of this device is to optimize the preceding device, the object being to maximize the intensity of the light spot output and thus to improve the efficiency of the system. Whereas the two previous embodiments confined the field near the aperture and limited loses within the structure, this embodiment has the additional goal of introducing a maximum flux into the cavity—that is to say of making best use of the power supplied by the incident illumination. The principle consists in adding two metal arrays 14 to the edge of a cavity 8, as shown in FIG. 11, so that illuminating them generates surface plasmons. More precisely, the structure comprises alternating layers that encircle the cavity 8 and are placed on the film 10, the layers being made of metal and dielectric alternately and the function of which is to enhance plasmon generation. As illustrated by the arrows in bold in FIG. 11, the propagation and then the diffraction of these plasmons at the upper edges of the cavity allow the plasmons to couple with the eigenmodes of the cavity, which leads to the field in the cavity being increased. The width of the cavity must be substantially equal to an integral number p of half-wavelengths $\lambda_{sp}$ of the plasmons which interfere. The depth of the cavity h must be substantially equal to have the wavelength $\lambda_{sp}$. In addition, the array nearest the cavity must be a distance d from the edges of the cavity equal to an integral number q of half plasmon-wavelengths $\lambda_{sp}$. The period or pitch separating two successive layers of the array is substantially equal to the wavelength of the plasmons to be reflected.

As in the above examples, an optical focusing device comprising a plasmon-enhanced metal resonant cavity may operate at the illumination wavelength of 532 nanometers, the light being polarized in the TM (transverse magnetic) mode, the substrate carrying the device is made of glass covered by a layer of PMMA, and the metal layer being deposited onto said PMMA layer. The metal film is a silver film. In the present case, the optimal width of the cavity is substantially 300 nanometers, its height 180 nanometers, the diameter of the aperture is 30 nanometers and its depth is 60 nanometers, the minimum array-cavity distance is 160 nanometers, the array pitch is 320 nanometers and the height of the patterns of the array is 15 nanometers.

Figure 12:
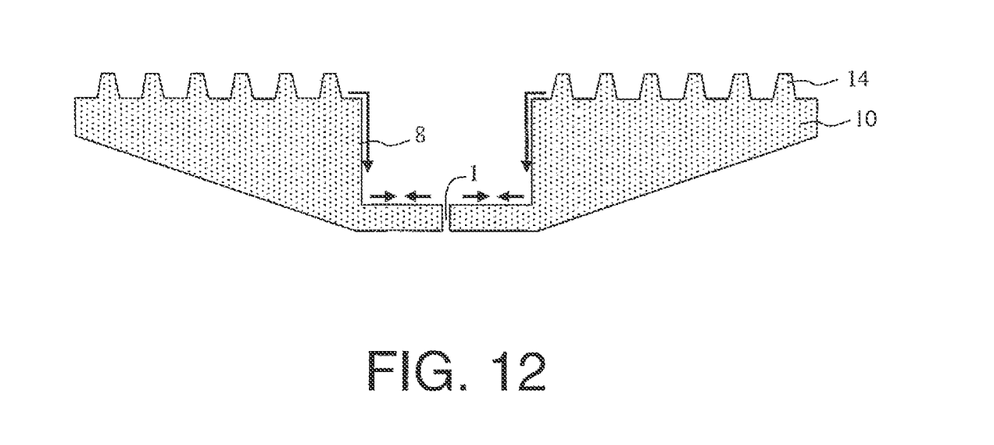
FIG. 12 shows a fourth embodiment of a focusing device according to the invention.

A fourth exemplary embodiment, illustrated in FIG. 12, of the focusing device is produced on a substrate that has a thickness that varies, the thickness at the center of the substrate being greater than the thickness at the periphery of the substrate. This substrate may for example be convex. The layers forming the reflecting or plasmon-generation-enhancing patterns may have a cross section that is not necessarily rectangular, it may for example be trapezoidal as illustrated in FIG. 12.

For applications using visible light, around a wavelength close to 530 nanometers, it is possible, by way of example, to use as materials:
- a transparent substrate, for example made of glass;
- a dielectric layer—for example made of an oxide, silica, a resin or PMMA (polymethyl methacrylate)—in which the various cavity and/or pattern layers are etched, and which forms the dielectric layer; and
- a metal or alloy coating which supports plasmons at the working wavelength, the coating being placed on said dielectric layer.

A metal able to support plasmons at the working wavelength is necessary. By way of example, it is possible to use silver or gold which are metals able to support plasmons in the visible and the infrared. For applications in the ultraviolet, aluminum may be used.

It should furthermore be noted that the dielectric is transparent at the illumination wavelength.

The substrate may be made of a luminescent material. Various types of excitation are possible for obtaining the luminescence, such as photoluminescence or electroluminescence. It should be noted that in the case of photoluminescence, the material is illuminated at a given wavelength and emits light at another wavelength. In the cases of electroluminescence, an electric potential is applied to the luminescent material and the latter emits light. When the luminescent material is illuminated or when a potential is applied, the luminescent material emits light at the working wavelength of the focusing device. The light emitted by the luminescent material is directly used as the source for illuminating the focusing device.

According to a variant, the substrate may comprise a transparent material and at least one layer made of a luminescent material.

Figure 13:
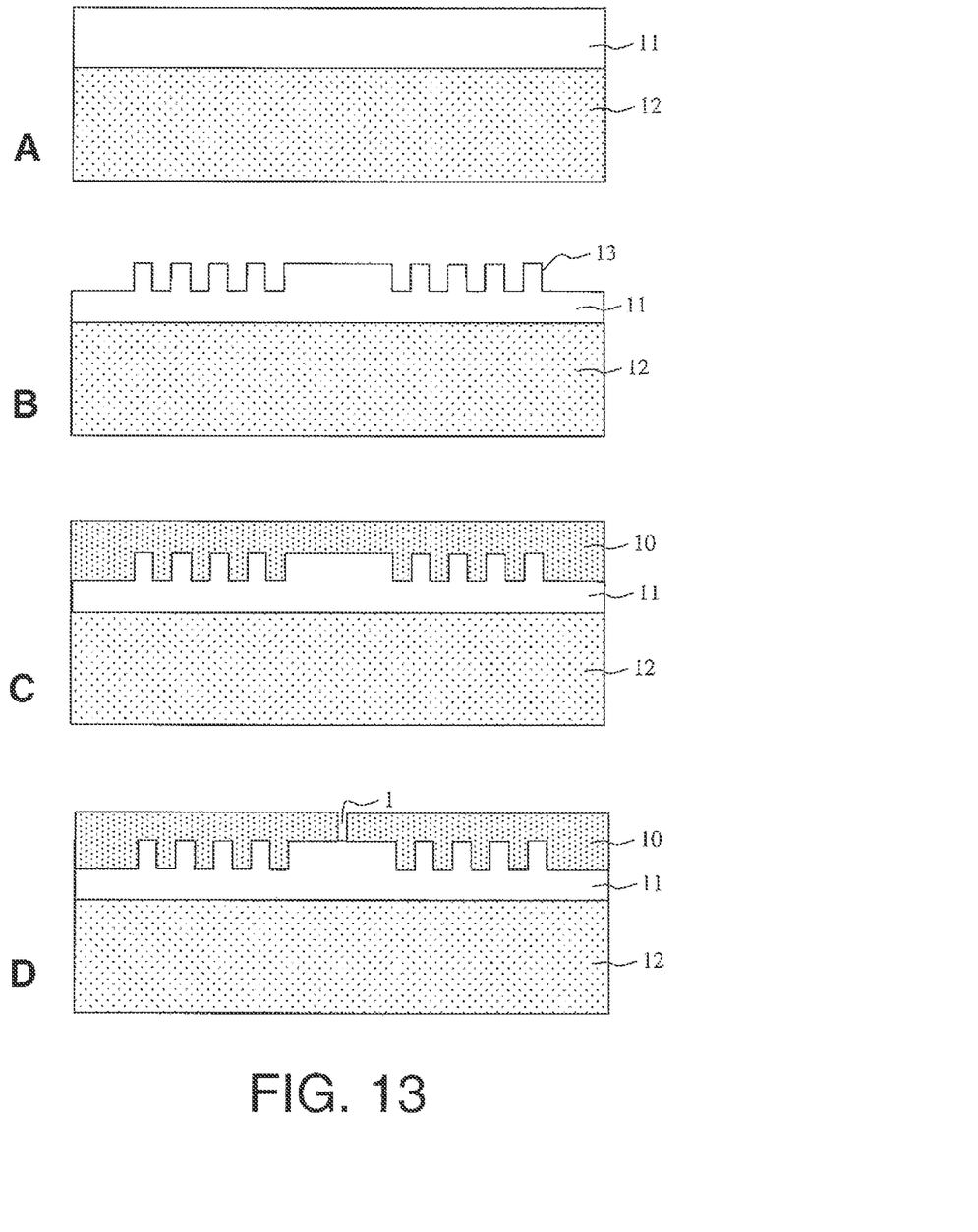
FIG. 13 shows the various steps of the process for producing an optical focusing device according to the invention.

By way of example, a process for producing optical focusing devices according to the invention is detailed in FIG. 13. This process, which is equally applicable to the various types of optical focusing devices according to the invention, essentially comprises the four following steps:
- in a first step A, a dielectric layer 11, for example made of PMMA, is deposited onto a substrate 12, for example a glass substrate;
- in a second step B, the structures forming the cavity and/or the patterns are etched using lithography, for example e-beam lithography, into the dielectric layer 11 (crenellations 13 in FIG. B);
- in a third step C, a metal film 10, which may be made of silver, is deposited, for example evaporated, sputtered or spin-coated, onto the patterns of the dielectric layer 11 so as to form the cavity and/or the patterns; and
- in a fourth step D, the metal film 10 is pierced, for example by means of a focused ion beam, so as to produce the aperture or apertures 1.

An additional step of planarizing the metal film after deposition may prove to be necessary so as to planarize the output surface.

In summary, the various geometrical parameters of the optical focusing device according to the invention have the following values for applications using visible light (with a wavelength close to 530 nanometers), corresponding, in the case of silver and PMMA, to a plasmon wavelength $\lambda_{sp}$ of about 320 nm:
- diameter of the optical focusing device—about one or more microns;
- width of the subwavelength aperture or apertures—about 30 nanometers;
- depth of the subwavelength aperture or apertures—about 60 nanometers;
- diameter of the metal cavity—about a wavelength or substantially equal to an integral number of plasmon wavelengths $\lambda_{sp}$, namely 310 nanometers;
- depth of the metal cavity—100 to 200 nanometers;
- pitch of the plasmon-reflecting patterns—about a few hundred nanometers. Advantageously the pitch is substantially equal to half a plasmon wavelength $\lambda_{sp}$;
- pitch of the plasmon-generation-enhancing patterns—about a few hundred nanometers. Advantageously the pitch is substantially equal to an integral number of plasmon wavelengths $\lambda_{sp}$, namely 320 nanometers;
- height of the plasmon-reflecting patterns—75 nanometers and height of the plasmon-generation enhancing patterns—15 nanometers; and
- number of patterns—a few units to a few tens of units.

With these devices it is possible to produce 70-nanometer diameter spots in the visible with an efficiency that may reach almost 30 percent.

In the above examples, the single aperture allows a single intense light spot of very small dimensions to be obtained. It is possible to modify the geometry of the aperture, of the cavity and of the patterns of the arrays to obtain more complicated patterns of light. It is possible, by way of example, to use a slit in the form of a very thin elongate rectangle, the slit being about a few tens of nanometers wide. It has been shown that it is possible to obtain a plurality of light spots as an output from the slit. Using FDTD methods the electromagnetic field strength output by the slit may be calculated and the number of spots, their energy distribution and their intensity may be determined. Thus, with a 50-nanometer wide slit pierced in a silver film illuminated at a 532-nanometer-wavelength, a single spot is obtained for a slit length of 195 nanometers, two light spots are obtained for a slit having a length of about 445 nanometers and three spots are obtained for a slit having a length of about 695 nanometers. These spots are centered on the slit and separated by a substantially constant pitch.

In this case, it is advantageous to match the shape of the cavity to the shape of the aperture. Thus, for a rectangular slit an oval or racetrack-shaped cavity is more suitable that a circular cavity and gives an improved performance.

In the above examples, devices making use of visible light have essentially been described and more precisely devices working at a wavelength of 532 nanometers. Of course, surface plasmons are not excited only when a silver film is combined with an illumination wavelength of 532 nanometers. Depending on the wavelength, various metals may be suitable.

Thus, at a wavelength of 193 nanometers, at least the following materials may be used to produce the metal film:
beryllium-aluminum-silica-titanium-vanadium-chromium-iron-cobalt-nickel-copper-germanium-niobium-molybdenum-rhodium-palladium-tin-antimony-tantalum-tungsten-rhenium-osmium-iridium.

Thus, at a wavelength of 248 nanometers, at least the following materials may be used to produce the metal film:

beryllium-aluminum-silica-vanadium-chromium-iron-cobalt-nickel-copper-germanium-niobium-molybdenum-rhodium-palladium-tin-antimony-rhenium-osmium-iridium-platinum.

Thus, at a wavelength of 405 nanometers, at least the following materials may be used to produce the metal film:

lithium-beryllium-aluminum-titanium-vanadium-chromium-iron-cobalt-nickel-copper-zinc-molybdenum-rhodium-palladium-silver-tin-antimony-tellurium-osmium-iridium-platinum-gold.

Thus, at a wavelength of 532 nanometers, at least the following materials may be used to produce the metal film:

lithium-sodium-aluminum-potassium-titanium-chromium-cobalt-nickel-copper-zinc-rhodium-palladium-sliver-tin-antimony-iridium-platinum-gold.

In the green, the metal giving the best performance is silver. In the blue or the near ultraviolet, the best choice is aluminum.

Thus, possible choices for a focusing device that must operate in the ultraviolet, at a wavelength of 248 nanometers, are a film made of aluminum, the complex refractive index of which is 0.19+2.94i, and a dielectric transparent to UV like sapphire of 1.9 refractive index.

Optical focusing devices according to the invention form, when they are illuminated, efficient and compact near-field optical sources which have multiple applications.

Their applications range from nanolithography, where these sources may be used in high-resolution point-by-point near-field lithography, to optical data storage. In this case, they may be used in high-capacity read and write systems, for example in systems using SILs (solid immersion lenses).

They may also be used in biology where they allow very small volumes to be analyzed, enhance fluorescence excitation and decrease the diffusion time of molecules, or they may be used in the fields of microscopy or lighting. In the latter application, inserting a light-emitting medium upstream of the focusing device structure creates a compact source that can be directly integrated into the rest of the system.

By way of nonlimiting example, the optical focusing devices may also be applied to the field of optical tweezers where their high efficiency solves the problem of energy availability and allows lower-power light sources, which are more easily handled, to be used.

Their geometry may also be modified so as to select the wavelength transmitted and they may thus be used to produce RGB color pixels for imaging applications.

These high-efficiency devices may also improve photodetection efficiency in the field of photodetectors by reducing the associated noise level.

Finally, they may be inserted with a two-dimensional geometry at the input or output of a waveguide to efficiently confine the light.

The invention claimed is:

1. An optical focusing device comprising
at least one focusing structure including:
a metal film provided with at least one aperture that penetrates the film,
said aperture having dimensions an order of magnitude smaller than a working wavelength of the focusing device,
the at least one focusing structure comprising at least one optical cavity that opens into the aperture or apertures, wherein lateral walls of the aperture being formed by the metal film,
wherein the cavity is a hole produced in a thickness of the metal film so as to open into the at least one aperture, the diameter of the cavity being at least three times greater than the dimensions of said aperture and a depth of the cavity being less than the thickness of the metal film,
wherein plasmons generated in the cavity by the working wavelength having a wavelength called the plasmon wavelength $\lambda_{sp}$, the width of the cavity is substantially equal to an integral number p of half plasmon-wavelengths, and
wherein the metal lateral walls of the cavity have a lateral thickness greater than the plasmon wavelength so as to reflect the plasmons present inside the cavity.

2. The optical focusing device as claimed in claim 1, wherein the depth of the cavity is substantially equal to half the plasmon wavelength.

3. The optical focusing device as claimed in claim 1, wherein the structure includes alternating layers that form patterns and are placed on the film, the layers being made of alternating metal and dielectric, the function of which layers is to enhance plasmon generation, said plasmons being generated when the focusing structure is illuminated with a radiant flux at the working wavelength of the optical focusing device.

4. The optical focusing device as claimed in claim 3, wherein the pitch of the patterns enhancing plasmon generation is substantially equal to an integral number of plasmon wavelengths.

5. The optical focusing device as claimed in claim 3, wherein the cross section of the patterns is substantially rectangular.

6. The optical focusing device as claimed in claim 3, wherein the cross section of the patterns is substantially trapezoidal.

7. The optical focusing device as claimed in claim 6, wherein the film is made of one of silver and gold and the film is configured for applications in the visible and in the infrared; and in that the film is made of aluminum and the film is configured for applications in the ultraviolet.

8. The optical focusing device as claimed in claim 3, wherein the dielectric is transparent at the illumination wavelength.

9. The optical focusing device as claimed in claim 8, wherein the dielectric used for applications in the visible is one of silica, a resin, and polymethyl methacrylate.

10. The optical focusing device as claimed in claim 1, wherein the film comprises a single aperture and the hole forming the cavity is centered on the aperture.

11. The optical focusing device as claimed in claim 1, wherein the film is made of a metal able to support plasmons at the working wavelength.

12. The optical focusing device as claimed in claim 1, further comprising a substrate on which the focusing structure is placed.

13. The optical focusing device as claimed in claim 12, wherein the substrate is luminescent or comprises at least one layer made of a luminescent material.

14. The optical focusing device as claimed in claim 12, wherein the substrate has a thickness that varies, the thickness at the center of the substrate being greater than the thickness at the periphery of the substrate.

15. The optical focusing device as claimed in claim 14, wherein the substrate is convex.

16. A process for producing an optical focusing device including at least one focusing structure including: a metal film provided with at least one aperture that penetrates the film, said aperture having dimensions an order of magnitude smaller than a working wavelength of the focusing device, the at least one focusing structure comprising at least one optical cavity that opens into the aperture or apertures, wherein lateral walls of the aperture being formed by the metal film, wherein the cavity is a hole produced in a thickness of the metal film so as to open into the at least one aperture, the diameter of the cavity being at least three times greater than the dimensions of said aperture and a depth of the cavity being less than the thickness of the metal film, wherein plasmons generated in the cavity by the working wavelength having a wavelength called the plasmon wavelength $\lambda_{sp}$, the width of the cavity is substantially equal to an integral number p of half plasmon-wavelengths, and wherein the metal lateral walls of the cavity have a lateral thickness greater than the plasmon wavelength so as to reflect the plasmons present inside the cavity, wherein the structure includes alternating layers that form patterns and are placed on the film, the layers being made of alternating metal and dielectric, the function of which layers is to enhance plasmon generation, said plasmons being generated when the focusing structure is illuminated with a radiant flux at the working wavelength of the optical focusing device, the process comprising the steps of:

depositing in a first step, a dielectric layer onto a substrate;

etching in a second step, patterns forming at least one mirror of the cavity and/or the patterns into the dielectric layer using lithography;

depositing in a third step, a metal film onto the dielectric layer patterns so as to form the cavity and/or patterns; and piercing in a fourth step, the metal film by a focused ion beam, so as to produce the first aperture.

17. An optical focusing device comprising at least one focusing structure including:

a metal film provided with at least one aperture that penetrates the film, said aperture having dimensions an order of magnitude smaller than a working wavelength of the focusing device, the focusing structure comprising at least one optical cavity that opens into the aperture or apertures, wherein the cavity is a hole produced in the thickness of the metal film so as to open into at least one aperture, the lateral walls of the hole being formed by the metal film, the diameter of the cavity being at least three times greater than the dimensions of said aperture and a depth of the cavity being less than the thickness of the metal film, wherein the at least one focusing structure including the metal film provided with the aperture and the cavity being configured without alternating layers or patterns.

* * * * *